P. H. CAREY.
Scrapers.

No. 152,072. Patented June 16, 1874.

WITNESSES.
A. Bennewendorf
Alex F. Roberts

INVENTOR.
P. H. Carey
BY
ATTORNEYS.

UNITED STATES PATENT OFFICE.

PETER H. CAREY, OF NEW YORK, N. Y.

IMPROVEMENT IN SCRAPERS.

Specification forming part of Letters Patent No. 152,072, dated June 16, 1874; application filed October 11, 1873.

*To all whom it may concern:*

Be it known that I, PETER H. CAREY, of the city, county, and State of New York, have invented a new and Improved Scraper, of which the following is a specification:

The improvement consists of a novel arrangement of apparatus by which the scraper is suspended from a truck so as to avoid the friction on the ground while taking a load and carrying it to the dumping-place, and so that it can be readily dumped while so suspended, all as hereinafter described.

Figure 1:
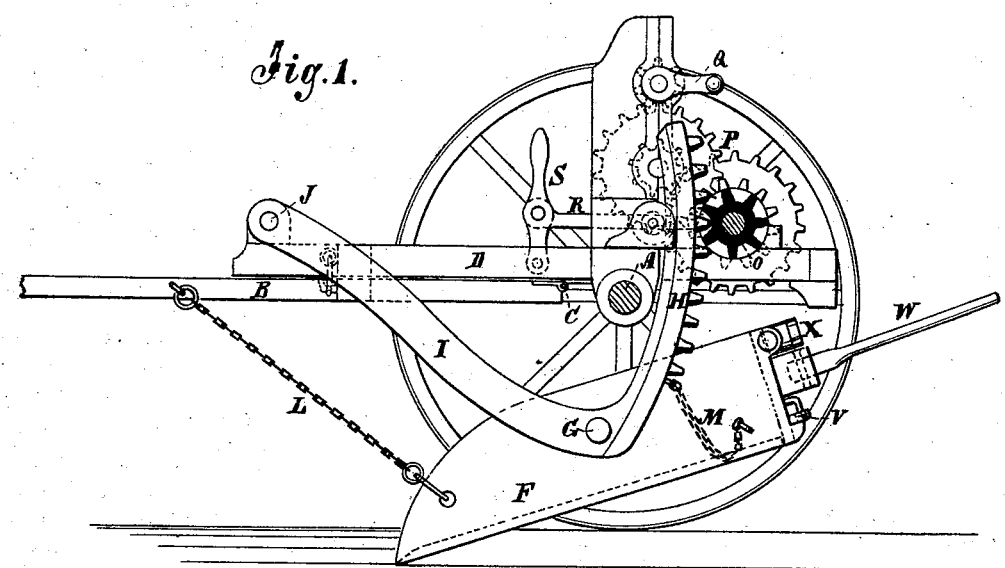
Figure 2:
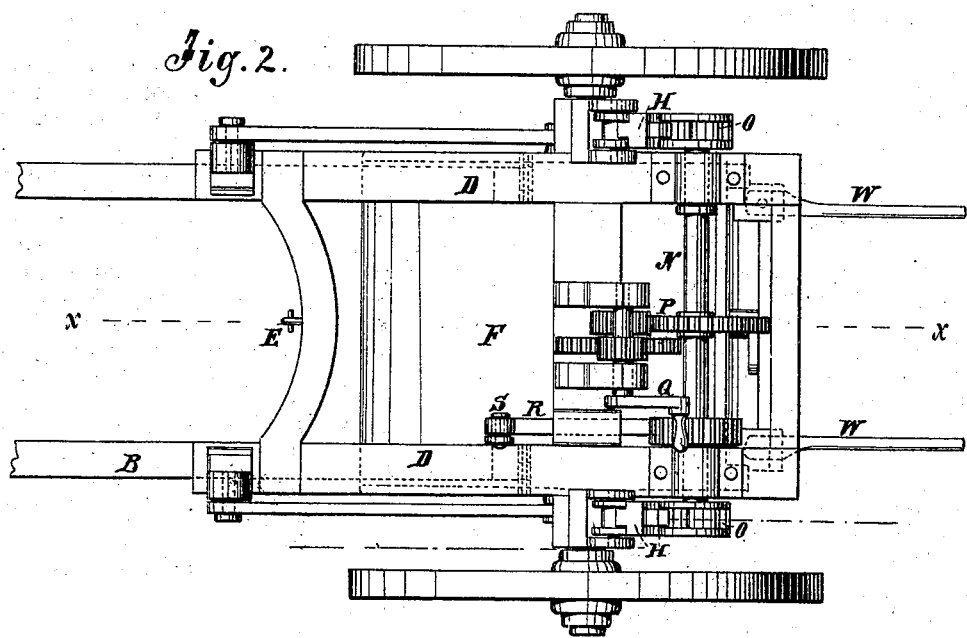
Figure 3:
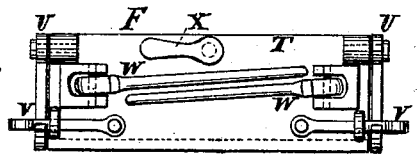

Figure 1 is a longitudinal elevation of my improved road-scraper, taken on the line $x\ x$ of Fig. 2. Fig. 2 is a plan view, and Fig. 3 is a rear elevation, of the scraper-box.

Similar letters of reference indicate corresponding parts.

A represents the axle of the truck, to which the tongue or shafts B are hinged at C. D is a frame, rigidly attached to the axle, and extending along the shafts some distance at the front, and fastened to them detachably by a link, hook, or other device at E. Said frame also extends rearward some distance beyond the axle. F represents the scraper-box or scoop, which is journaled at the middle of the sides, or thereabout, as at G, to a pair of segments or curved-toothed racks, H, at their lower ends, where they are attached to an arm, I, extending to the forward end of the frame D, and pivoted to it at J; said scraper is also connected at the front end, by draft-chains L, to the tongue, and at the rear it is connected, by stop-chains M, with the toothed segments. These segments gear with pinions O on a shaft, N, which is mounted on frame D, and gears, by a train of gears, P, with a crank-shaft, Q, or any other competent driving-power, for turning it to raise and lower the scraper. A sliding catch, R, having a lever, S, to work it, is arranged to slide into and out of the teeth of one of the pinions, to lock the hoisting and lowering apparatus to hold the scraper in any required position. The rear end board T of the scraper is pivoted to the sides at U to open and close, and has fastenings V for keeping it shut; it also has handles W for guiding it, said handle being jointed to it to fold up against the end, and be fastened by a catch, X.

To operate the machine the scraper is lowered by the hand-crank and gearing enough for it to scrape up a load by depressing the front end and raising the rear. Then it is raised sufficiently high to be transported to the place for discharging, the frame D is disconnected from the tongue at E, the back end board T is unfastened, and both the frame D and box F are tilted down behind, which allows the load to escape.

The stop-chains M prevent the box from tilting backward too much when the load is being moved along in case it happened to be heaviest behind the pivots G.

If necessary to balance the load on the cart more forward the shaft N may be shifted to the forward side of the segments H.

Having thus described my invention, I claim as new and desire to secure by Letters Patent—

The combination of the toothed segments H, arms I, hoisting and lowering shaft N, and mechanism for operating it, frame D, and scraper F, with a truck, substantially as specified.

PETER H. CAREY.

Witnesses:
A. P. THAYER,
T. B. MOSHER.